July 22, 1969  W. H. THOMPSON ET AL  3,456,541
RING SPECIMEN CUTTING JIG
Filed July 31, 1967
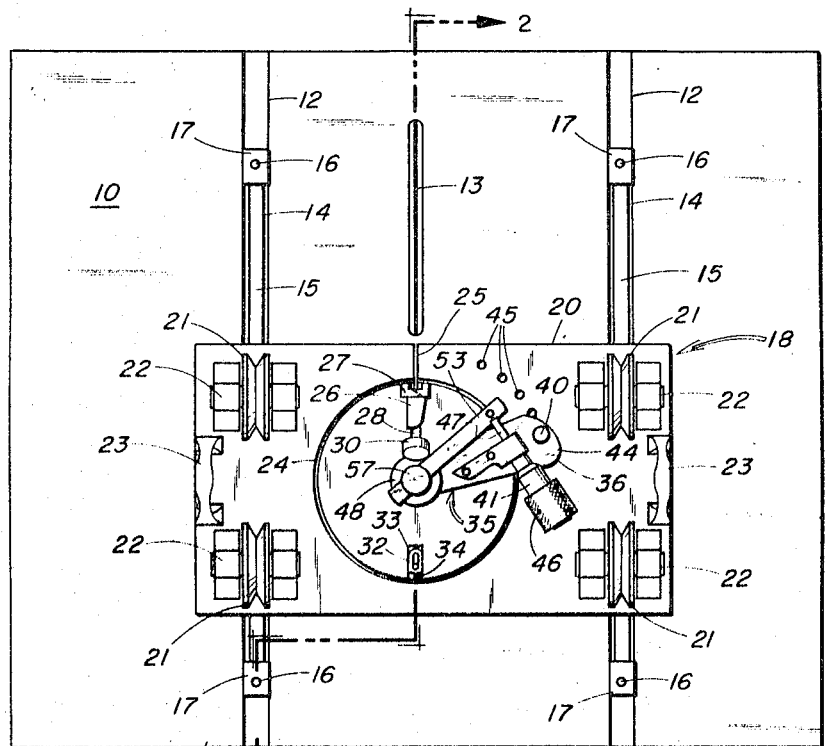
FIG. 1
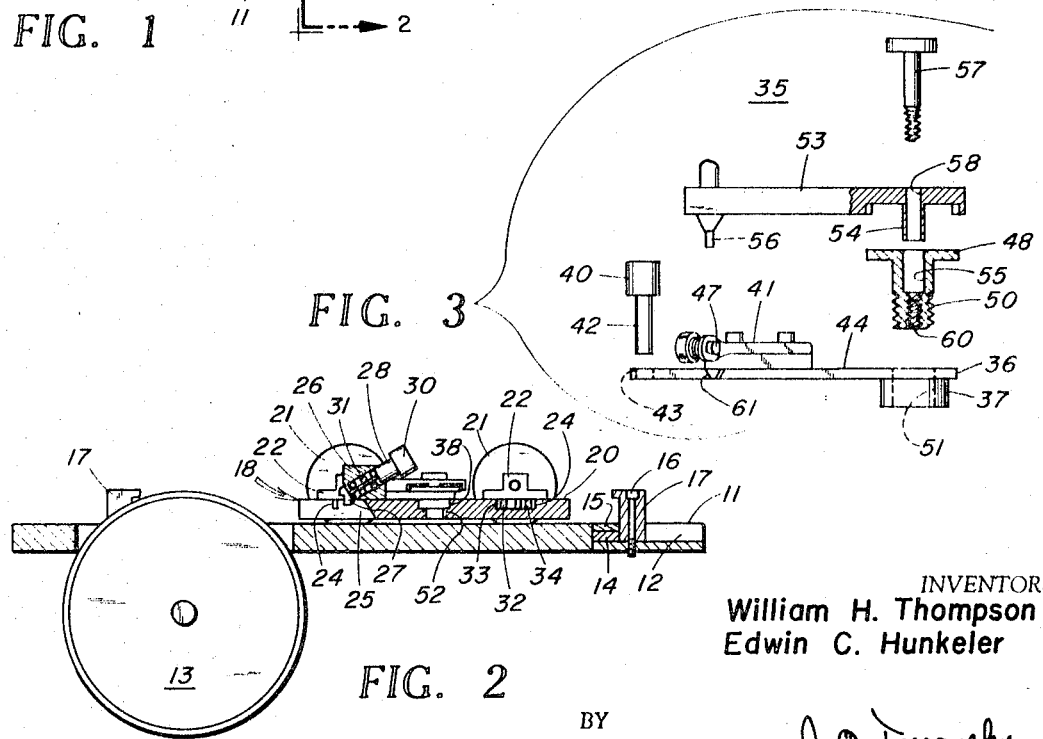
FIG. 3
FIG. 2
INVENTORS
William H. Thompson
Edwin C. Hunkeler
BY
J. O. Tresansky
ATTORNEY

United States Patent Office 3,456,541
Patented July 22, 1969

3,456,541
RING SPECIMEN CUTTING JIG
William H. Thompson, Berwyn Heights, and Edwin C. Hunkeler, Adelphi, Md., assignors to the United States of America as represented by the Secretary of the Navy
Filed July 31, 1967, Ser. No. 657,737
Int. Cl. B26d 7/06
U.S. Cl. 83—415                                10 Claims

ABSTRACT OF THE DISCLOSURE

An apparatus for positioning and holding standard rings specimens or segments thereof while accurately dimensioned test samples are cut therefrom. A standard ASTM ring test specimen or an arcuate segment thereof is mounted on a work holder or cutting jig which permits the specimen to rotate while preventing radial shifting. An accurate adjusting assembly locates an end of the arcuate segment of the ring in relationship to a cutting blade such that a desired length of arcuate specimen can be cut therefrom.

Background of the invention

This invention relates generally to cutting jigs, and more particularly to a ring specimen cutting jig.

For various purposes, and particularly for the production of standard material testing samples, it is necessary to obtain an arcuate strip of the material to be tested of accurately predetermined length. The American Society for Testing and Materials (ASTM) has established a set of standards for testing various materials, and included in the standards are the specimen dimensions to be used in the various tests. For testing reinforced plastics and certain other materials the ASTM recommends a ring test specimen (ASTM Designation: D2291–64T) of specific accurate dimensions. For certain tests the circular ring specimens themselves are used while for certain other tests accurately dimensioned arcuate segments, such as half rings, quarter rings and small arcuate ring segments, are used as the specimens. It is apparent that each specimen must be of the same dimension and quality if comparative tests are to have any significant meaning. There has, therefore, developed a need for a device for accurately cutting ring specimen segments of consistent dimensions and quality. While such arcuate specimens can be cut from a standard ring specimen by hand, and the necessary accuracy of length thus achieved, such a procedure is very slow and inconsistent, and has been found to be unsatisfactory. Simple shearing devices have been found to be unsuccessful in cutting ring specimen samples, because these devices are limited to cutting segments from relatively thin rings of a limited class of materials.

Summary of the invention

It is accordingly an object of the present invention to provide a cutting jig which accurately and consistently positions a circular ring or ring segment for cutting of an arc of predetermined accurate length therefrom.

Another object is to provide a cutting jig which is capable of accurately positioning circular rings or ring segments of various lengths and thicknesses.

A further object is to provide a ring specimen cutting jig which is capable of accurately and quickly cutting a whole circular ring into two identical half rings.

Yet another object is to provide a ring specimen cutting jig which can be easily used for guiding a ring specimen or ring segment specimen into a standard carpenter's saw for cutting a specimen of preselected length with speed and accuracy.

Briefly, in accordance with one embodiment of this invention, these and other objects are attained by providing a work holder or cutting jig which is capable of aligning a desired length of arcuate ring specimen with a standard cutting means such as a carpenter's saw by positioning a ring specimen or arcuate segment thereof on the cutting jig, aligning the specimen for the desired length by means of an accurate adjusting assembly, and moving the cutting jig relative to the saw to cut the desired preselected length of ring specimen.

Brief description of the drawing

FIG. 1 is a top plain view of the ring specimen cutting jig of the present invention mounted on a standard carpetner's saw;

FIG. 2 is a detailed explosive view of the adjustment assembly; and,

FIG. 3 is a sectional view taken along the line 3—3 of FIG. 1.

Description of the preferred embodiment

Referring now to the drawing wherein like reference numerals designate identical or corresponding parts throughout the several views, and more particularly to FIG. 1 whereon the numeral 10 generally designates a conventional cutting machine such as a carpenter's saw having a flat horizontal working surface 11 with parallel grooves 12 therein. A cutting device such as a rotary saw blade or diamond impregnated cutting wheel 13 has a portion thereof extending above the working surface 11 to provide a cutting surface. As seen in FIG. 2, bars 14 having track members 15 affixed thereto, are seated within grooves 12, and are secured to the working surface 11 by means of fasteners such as screws 16. At each end of bars 14 a stop member 17 is provided for reasons to be more fully explained hereinafter. The ring specimen cutting jig 18 of the present invention is shown in FIGS. 1 and 2 mounted on track members 15.

The ring specimen cutting jig 18 includes a base member 20 having a plurality of rollers 21 rotationally mounted thereon by means of bearing supports 22. As seen in FIG. 2, rollers 21 extend through base member 20 to engage track members 15 such that the ring specimen cutting jig 18 rides on the track members 15 to engage cutting blade 13. Handles 23 secured to base member 20 are provided for convenience of transporting the ring specimen cutting jig 18, and moving the cutting jig along the track members 15. Stop members 17 limit the movement of the cutting jig, and prevent the rollers 21 from riding off the ends of tracks 15. A ring specimen positioner such as circular groove 24 is centrally located on the top surface of base member 20 for retaining a ring specimen and for preventing radial shifting thereof. Cutting blade 13 is guided through the ring specimen by a slot 25 in such a manner that the cutting blade will traverse groove 24 and the ring specimen retained therein.

A holding clamp 26 is mounted inwardly of the groove 24 on the base member 20 and is in radial alignment with the blade guide slot 25. A bifurcated anvil portion 27 of clamp 26 is fixedly secured to a spring biased rod member 28 having a finger depressor knob 30 on the inward end thereof. By depressing knob 30 against a spring 31, the anvil portion 27 engages the ring specimen and holds the specimen securely in place during cutting. Diametrically opposite slot 25 a stop member 32 is slidingly mounted within a recess 33 formed in base member 20 which intersects groove 24 in alignment with cutting blade 13 and the blade guide slot 25. A projection 34 on stop member 32 is substantially of the same width as the cutting blade 13, and when stop member 32 is moved radially outwardly the projection 34 intersects the positioning groove 24.

A ring specimen can be cut into two identical half rings by cutting the ring specimen at the intersection of the guide slot 25 and the positioning groove 24, rotating the ring specimen 180° to a second position wherein the cut in the ring specimen is aligned with stop member 32, inserting projection 34 in the cut in the ring, and cutting the ring specimen at the intersection of the guide slot 25 and the positioning groove 24 while the ring specimen is in the second position. Although not shown in the drawing, by providing stop members at other locations than shown at 32, the cutting jig could use members such as projection 34 for cutting quarter ring segments or for that matter any size arcuate segment.

Pivotally mounted centrally of the positioning groove 24 is an adjustment assembly 35, shown disassembled in detail in FIG. 3, for gauging the length of ring segment specimen to be cut, when the desired length of ring segment is less than a half ring. An adjusting member 36, pivotally mounted about the center of the positioning groove 24 by means of a downwardly extending hub 37 seated within a hole 38 in the base member 20, consists of an incremental adjusting device 40 and a precision adjusting device 41. The incremental adjusting device 40 is illustrated in FIGS. 1 and 3 as a pin member 42 slidingly mounted within a guide hole 43 in an elongated plate member 44 to engage a selected one of a series of circumferentially spaced holes 45 formed in the base member 20 each of which is equally spaced radially from the positioning groove 24. The precision adjusting device 41, illustrated by way of example as a micrometer, is mounted on the upper surface of the elongated plate member 44, and consists of a rotatable handle portion 46 and an adjustably movable anvil portion 47. A hollow clamp 48, having a lower threaded portion 50, extends through an aperture 51 in the hub 37, and secures the adjusting member 36 to the base member 20 by engaging a lower threaded portion 52 of hole 38. An abutment member such as arm 53 is pivotally mounted about one end thereof by means of a downwardly extending projection 54 seated within an aperture 55 in the clamp 48. On the outer end of arm 53 is a downwardly extending abutment portion 56 which seats within groove 24 for sliding movement therein. A notch 61 is provided in the plate member 44 for engagement with the abutment portion 56 to align the abutment portion 56 with the micrometer anvil 47. A holding member such as screw 57 extends through an aperture 58 in projection 54 to engage a lower threaded portion 60 in aperture 55, thus firmly clamping the adjustment assembly 35 in the selected position. For cutting small ring specimen segments, a large ring segment is placed within groove 24 and brought into engagement with the abutment portion 56 which has been accurately positioned by means of the incremental adjusting means 40 and the precision adjustment means 41.

Obviously numerous modifications and variations of the present invention are possible in the light of the above teachings. It is therefore to be understood that within the scope of the appended claims the invention may be practiced otherwise than as specifically described therein.

What is claimed is:

1. A ring specimen cutting jig comprising
a base member having ring specimen positioning means thereon for holding a ring specimen in a first position relative to a cutting device,
means in said base member traversing said positioning means for guiding said cutting device through the specimen held by said positioning means while in said first position, and
stop means on said base member intersecting the cut portion of said ring specimen a fixed preselected distance from said guiding means for holding said ring specimen in a second position relative to said cutting device.

2. The apparatus of claim 1 wherein,
said positioning means is a circular groove cut in said base member having a radius and width substantially equal to that of the ring specimen, and
said guiding means is a slot cut in said base member.

3. The apparatus of claim 1 wherein said base member includes,
rollers for moving said base member relative to said cutting blade.

4. A ring specimen cutting jig comprising
a base member,
positioning means on said base member for holding a ring segment,
means on said base member traversing said positioning means for guiding a cutting blade through said ring segment,
an abutment member movable within said positioning means for determining the length of the ring specimen to be cut,
incremental adjusting means for selectively locating said abutment member relative to said guiding means within said positioning means, and
precision adjusting means on said incremental adjusting means for accurately determining the position of said abutment member with respect to said guide means.

5. The apparatus of claim 4 wherein,
said positioning means comprises a circular groove cut in said base member and having a radius and width substantially equal to that of said ring specimen, and
said guide means is a slot cut in said base member.

6. The apparatus of claim 4 wherein,
said base member has a series of circumferentially spaced holes defined therein each of said holes being equally spaced radially from said positioning means,
said incremental adjusting means comprises an elongated plate member pivotally mounted centrally of said positioning means and having a guide hole extending therethrough at a radial distance from said pivot equal to the radial distance from said pivot to said circumferentially spaced holes,
means included on said incremental adjusting means for engaging said abutment member,
and a pin member slidingly mounted in said guide hole in said plate member for engagement with one of said circumferentially spaced holes.

7. The apparatus of claim 6 wherein,
said precision adjustment means is a micrometer having an anvil portion for contacting and positioning said abutment member.

8. The apparatus of claim 7 wherein,
said positioning means includes a circular groove cut in said base member and having a radius and width substantially equal to that of said ring specimen, and
said guide means is a slot cut in said base member.

9. The apparatus of claim 8 wherein,
said abutment member is an elongated arm pivotally mounted centrally of said positioning means and having a downwardly extending portion located in said circular groove for abutment with an end of said ring specimen segment.

10. The apparatus of claim 9 including, stop means on said base member for intersecting said ring specimen a preselected fixed distance from said guide means, track members subjacent to said base membr for aligning said guide means with said cutting blade, and rollers on said base member for moving said base member on said track members relative to said cutting blade.

References Cited

UNITED STATES PATENTS

| | | | |
|---|---|---|---|
| 991,710 | 5/1911 | Flugstad et al. | 83—409 |
| 1,324,666 | 12/1919 | Greer | 83—409 X |
| 1,522,123 | 1/1925 | Higgins | 83—409 X |
| 1,699,985 | 1/1929 | Mulholland | 83—409 |

ANDREW R. JUHASZ, Primary Examiner

FRANK T. YOST, Assistant Examiner

U.S. Cl. X.R.

83—416, 437